United States Patent
Wu et al.

(10) Patent No.: US 9,306,465 B2
(45) Date of Patent: Apr. 5, 2016

(54) METHOD FOR CONTROLLING A CONVERTER HAVING VARIABLE FREQUENCY CONTROL AND SYSTEM FOR POWERING A VEHICLE LOAD USING SAME

(75) Inventors: Xiangchun Wu, Farmington Hills, MI (US); Richard J. Hampo, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 406 days.

(21) Appl. No.: 13/157,452

(22) Filed: Jun. 10, 2011

(65) Prior Publication Data

US 2012/0313430 A1 Dec. 13, 2012

(51) Int. Cl.
*H02M 3/335* (2006.01)
*H02M 3/337* (2006.01)
*H02M 1/00* (2007.01)

(52) U.S. Cl.
CPC ............ *H02M 3/3376* (2013.01); *H02M 3/335* (2013.01); *H02M 2001/0058* (2013.01); *Y02B 70/1491* (2013.01)

(58) Field of Classification Search
CPC .................... H02M 3/3376; H02M 2001/0058; H02M 3/335; H02M 7/537; Y02B 70/1491; B60L 1/00
USPC ............... 363/16, 17, 19, 20, 95, 97, 98, 131, 363/132; 307/9.1, 10.1
See application file for complete search history.

(56) References Cited

U.S. PATENT DOCUMENTS

| | | | |
|---|---|---|---|
| 5,838,558 A | 11/1998 | Tan et al. | |
| 6,188,199 B1 | 2/2001 | Beutler et al. | |
| 6,807,070 B2 | 10/2004 | Ribarich | |
| 6,903,949 B2 | 6/2005 | Ribarich | |
| 2003/0107120 A1 | 6/2003 | Connah et al. | |
| 2003/0147263 A1 | 8/2003 | Ribarich | |
| 2004/0012985 A1 | 1/2004 | Ribarich | |
| 2008/0205109 A1* | 8/2008 | Darroman et al. | 363/132 |
| 2009/0103341 A1 | 4/2009 | Lee et al. | |
| 2009/0196072 A1* | 8/2009 | Ye | 363/17 |
| 2010/0038962 A1 | 2/2010 | Komatsu | |
| 2010/0127669 A1 | 5/2010 | Iida | |
| 2010/0220500 A1* | 9/2010 | Mino et al. | 363/17 |
| 2010/0220501 A1 | 9/2010 | Krause | |
| 2010/0231178 A1 | 9/2010 | Handa et al. | |
| 2010/0315043 A1 | 12/2010 | Chau | |
| 2011/0175584 A1* | 7/2011 | Huber et al. | 323/282 |

FOREIGN PATENT DOCUMENTS

| | | |
|---|---|---|
| CN | 101254757 A | 9/2008 |
| CN | 101795076 A | 8/2010 |
| DE | 69834981 | 10/2004 |
| TW | 406463 B | 9/2000 |
| TW | 200301613 A | 6/2003 |

OTHER PUBLICATIONS

German Office Action for German Application No. 10 2012 208 543.2 dated Nov. 5, 2013.

* cited by examiner

*Primary Examiner* — Jue Zhang
*Assistant Examiner* — Gustavo Rosario Benitez
(74) *Attorney, Agent, or Firm* — Brooks Kushman P.C.

(57) ABSTRACT

A converter operable for powering one or more loads having a variable switching frequency. The switching frequency of the converter being selectable based on a desired output power level and/or whether switching of a plurality of switches of the converter is characterized as zero voltage switching (ZVS) or non-zero voltage switching (NZVS).

15 Claims, 5 Drawing Sheets

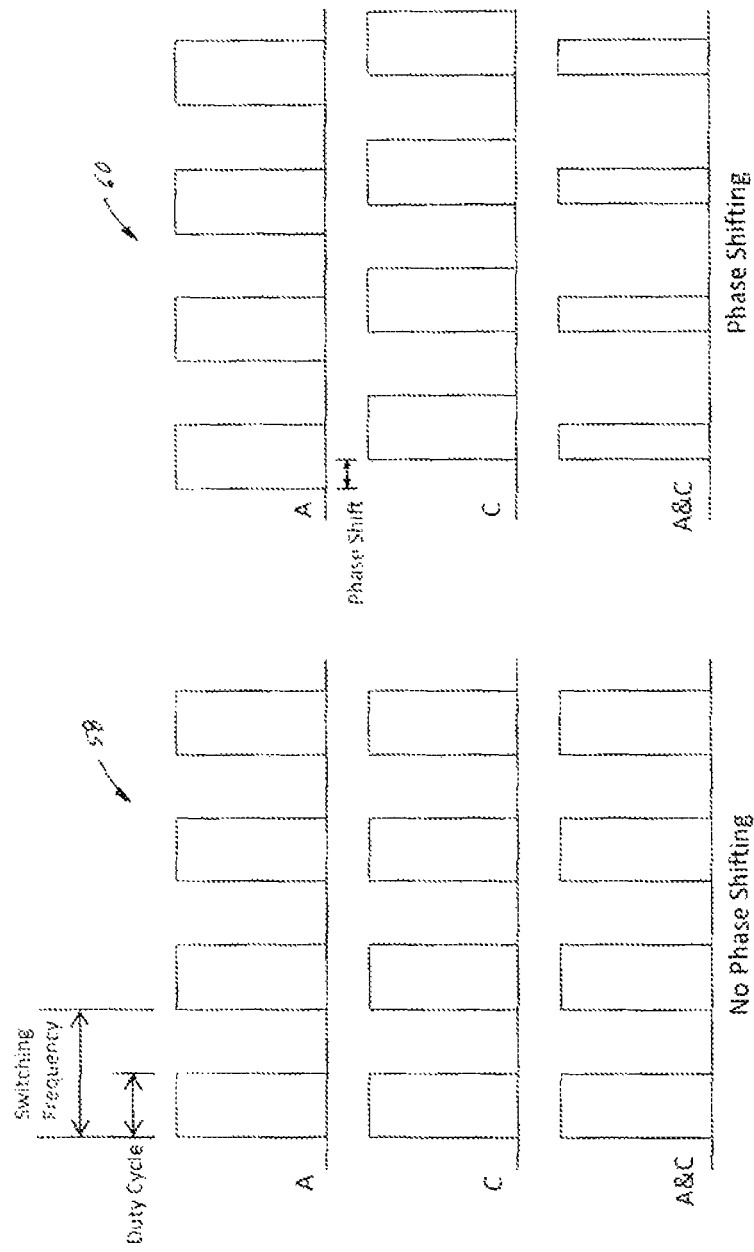

US 9,306,465 B2

METHOD FOR CONTROLLING A CONVERTER HAVING VARIABLE FREQUENCY CONTROL AND SYSTEM FOR POWERING A VEHICLE LOAD USING SAME

TECHNICAL FIELD

The present invention relates to converters having variable frequency control, such as but not limited to converters of the type operable within a vehicle to facilitate regulating power for use in charging a high voltage vehicle battery and/or other vehicle systems.

BACKGROUND

DC-DC, DC-AC, and AC-DC converters are used in some electronic applications to facilitate regulator power delivered to a load. The converters may be configured to output power having a desired set of current and voltage characteristics. The electronic applications may include multiple loads with different power regulation needs such that the electronic applications may be configured to include separate, dedicated converters for each load having particular power regulation needs. The use of such separate, dedicated converts can be problematically costly given the expense associated with configuring, assembling, and operating multiple converters.

SUMMARY

One non-limiting aspect of the present invention contemplates a converter operable to support multiple power regulation profiles such that the same converter may be used to facilitate power regulation for loads having particular power regulation needs.

One non-limiting aspect of the present invention contemplates a method of controlling a converter having a plurality of switches operable with a transformer to convert a DC input to an AC output where the plurality of switches are selectively operable between an open state and a closed state. The method may include: determining a first switching frequency for the plurality of switches, the first switching frequency operable to induce zero voltage switching (ZVS) of the plurality of switches during transition, such as when transitioning from the open state to the closed state; and determining a second switching frequency for the plurality of switches, the second switching frequency operable to induce non-zero voltage switching (NZVS) of the plurality of switches when transitioning from the open state to the closed state.

One non-limiting aspect of the present invention contemplates determining the second switching frequency to be a frequency less than the first switching frequency.

One non-limiting aspect of the present invention contemplates determining a switching schedule for the plurality of switches when set to the first switching frequency, the duty cycle causing the AC output to have a first power level.

One non-limiting aspect of the present invention contemplates phase shifting the switching schedule for the plurality of switches when set to the second switching frequency, the phase shifting causing the AC output to have a second power level less than the first power level.

One non-limiting aspect of the present invention contemplates: receiving a power request from at least one load receiving the AC output; setting the plurality of switches to the first switching frequency in the event the power request requests a power level greater than a threshold; and setting the plurality of switches to the second switching frequency in the event the power level is less than the threshold.

One non-limiting aspect of the present invention contemplates rectifying the AC output to a DC output sufficient for use in charging a high voltage vehicle battery.

One non-limiting aspect of the present invention contemplates a method of controlling a converter having a plurality of switches operable with a transformer to convert a DC input to an AC output where the plurality of switches are selectively operable between an open state and a closed state. The method may include: determining a power level for the AC output; determining a switching schedule for the plurality of switches sufficient to generate the AC output at the power level; determining the switching schedule to induce the plurality of switches to transition from the open state to the closed state with one of zero voltage switching (ZVS) and non-zero voltage switching (NZVS); determining a first switching frequency for the plurality of switches in the event ZVS is determined; and determining a second switching frequency for the plurality of switches in the event NZVS is determined.

One non-limiting aspect of the present invention contemplates determining the second switching frequency to be less than the first switching frequency.

One non-limiting aspect of the present invention contemplates determining the second switching frequency to be half of the first switching frequency.

One non-limiting aspect of the present invention contemplates determining the power level to equal a total power demand of one or more loads actively operable within a vehicle to receive the AC output.

One non-limiting aspect of the present invention contemplates rectifying the AC output to a DC output prior to receipt by at least one of the one or more loads.

One non-limiting aspect of the present invention contemplates phase shifting the plurality of switches when operating according to the second switching frequency by an amount greater than when operating according to the first switching frequency.

One non-limiting aspect of the present invention contemplates: measuring a voltage across at least one of the plurality of switches to determine the one of the ZVS and NZVS; determining the ZVS in the event the voltage is approximately zero when the at least one of the plurality of switches transitions from the close stated to the open state; and determining the NZVS in the event the voltage is sufficiently greater than zero when the at least one of the plurality of switches transitions from the open state to the closed state.

One non-limiting aspect of the present invention contemplates the at least one switch being a transistor and the method further comprising measuring the voltage between a drain and a source of the transistor.

One non-limiting aspect of the present invention contemplates the switching schedule specifying a phase shift for the plurality of switches and the method determining the ZVS in the event the phase shift is greater than a threshold and the NZVS in the event the phase shift is less than the threshold.

One non-limiting aspect of the present invention contemplates a system for powering one or more loads within a vehicle. The system may include: a converter having a plurality of switches operable with a transformer and a rectifier to convert a DC input to an AC output and then to rectify the AC output to a DC output for use in powering the one or more loads, the plurality of switches being selectively operable between an open state and a closed state; a controller operable to selectively control switching of the plurality of switches between the open state and the close state, the controller operable to: determine a power level for the DC output based on a one or more of the one or more loads actively requesting the DC output; determine switching required of the plurality of switches to facilitate output of the DC output at the determined power level as of one of zero voltage switching (ZVS) and non-zero voltage switching (NZVS); selectively control switching of the plurality of switches at a first switching frequency in the event ZVS is determined; and selectively control switching of the plurality of switches at a second switching frequency in the event NZVS is determined.

One non-limiting aspect of the present invention contemplates the second switching frequency being less than the first switching frequency.

One non-limiting aspect of the present invention contemplates the controller determining ZVS when the power level is equal to or greater than a power level threshold and NZVS when the power level is less than then power level threshold.

One non-limiting aspect of the present invention contemplates at least one of the plurality of switches being a transistor, and wherein ZVS is determined when a voltage from a drain to a source of the transistor is approximately zero when the transistor transitions from the open state to the closed state and NZVS is determined when the voltage from the drain to the source of the transistor is sufficiently greater than zero when the transistor transitions from the open state to the closed state.

One non-limiting aspect of the present invention contemplates the first switching frequency being 250 kHz in the event the power level is approximately 3.3 kW and the second switching frequency being 125 kHz in the event the power level is less than 500 W.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIGS. 3-4 illustrate exemplary switching schedules in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
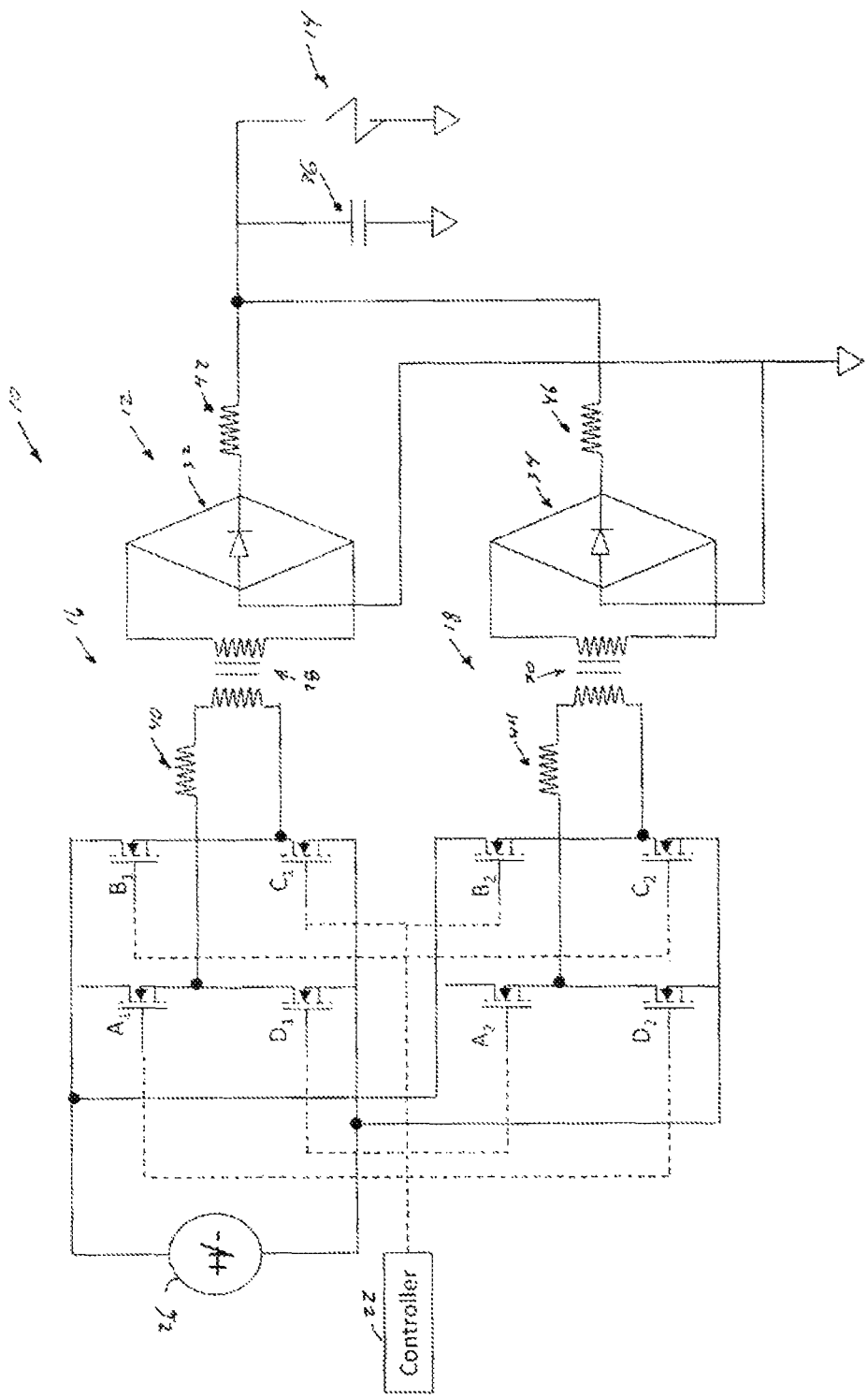
FIG. 1 illustrates a system having variable frequency controlled converter in accordance with one non-limiting aspect of the present invention.

FIG. 1 illustrates a system 10 having variable frequency controlled converter 12 in accordance with one non-limiting aspect of the present invention. The system 10 is predominately described for exemplary purposes as being configured to support powering one or more vehicle loads 14, such as but not limited to support charging a high voltage vehicle battery and/or otherwise powering other vehicle systems. The present invention, however, is not necessarily limited to vehicles and fully contemplates the use of the variable frequency controlled converter 12 in other non-vehicle application, such as but not limited to isolated or non-isolated DC-to-DC converters, DC-to-AC inverters and AC-to-AC converters, wherein voltage duty cycle is regulated such that volt-sec area of main transformer of isolated system is controlled The converter 12 is shown as having an interleaved configuration of first converter 16 (converter #1) and second converter 18 (converter #2) where a plurality of switches $A_1$, $A_2$, $B_1$, $B_2$, $C_1$, $C_2$, $D_1$, $D_2$ are operable in response to signals received from a controller 22. The controller 22 may be configured to control the switching of the switches A1, A2, B1, B2, C1, C2, D1, D2 to provide any suitable processing of a DC input 26, such as but not limited to a DC input from plug-in charging system, wall outlet, etc. The switches A1, A2, B1, B2, C1, C2, D1, D2 may be controlled to convert the DC input to an AC input that is then carried to a respective one of a first and second transformer 28, 30. The AC input to on the primary side of each transformer 28, 30 generates an AC output at the secondary side, which as shown, may be rectified with a rectifier 32, 34 in order to generate a DC output. The DC output may then be smoothed with a capacitor 36 prior to reaching one or more loads The converter 12 is shown to include inductors 40, 42, 44, 46 on both the input and output sides of each transformer 28, 30. The inductors 40, 42, 44, 46 may be operable with and/or sized relative to the other converter components to facilitate zero voltage switching (ZVS). The ZVS may be characterized as occurring when a voltage across the switches A1, A2, B1, B2, C1, C2, D1, D2 is substantially zero during a switch transition where a switch A1, A2, B1, B2, C1, C2, D1, D2 transitions from an open state to an closed state. One non-limiting aspect of the present invention contemplates the switches A1, A2, B1, B2, C1, C2, D1, D2 being transistors and determining ZVS when the voltage measured between the drain and source of the transistor is approximately zero and/or when load power is within the corresponding power threshold/rating for the given operation.

The converter 12 may be configured to support a wide range of power output levels. The illustrated converter 12, for example, may be configured to support 0-3.3 kW at a regulated voltage of 250-420 Vdc. The ability to support multiple DC output power levels can be beneficial in that the operation of the converter 12 can be adjusted according to the power demands of the loads 14 currently requesting power instead of having to provide dedicated converters for each load 14 and/or for each supported DC output. The controller 12 may be configured to assess the power demands of the actively or soon to be actively operable loads 14 and to set a switching schedule for the switches A1, A2, B1, B2, C1, C2, D1, D2 as a function thereof in order to insure the DC output is generated at appropriate power level, voltage, and/or current.

The converter components, i.e., the inductors 40, 42, 44, 46, transformers 28, 30, and switches A1, A2, B1, B2, C1, C2, D1, D2, may be sized such that ZVS occurs when the DC output is closer to the maximum operating capabilities of the converter, i.e., 3.3 kW. The occurrence of ZVS when the converter 12 is operating closer to the maximum output range may be beneficial in achieving a maximum efficiency for the converter 12 while operating at its rated levels. Since the characteristics of the components may be fixed, i.e., they may not be changeable in some configurations of the converter 12, ZVS may not be achieved when the DC output deviates too much from the maximum design range. A sufficient deviation can produce NZVS and the attendant loss in converter efficiency, which may more beneficial than having to have multiple converters.

The converter components may also be selected to have characteristics suitable to a certain switching frequency used to control the plurality of switches A1, A2, B1, B2, C1, C2, D1, D2 when operating closer to the maximum output levels. When selecting the converter component characteristics, the size of the components decreases as the selected switching frequency increases such that for the same desired output, e.g., 3.3 kW, smaller converter components may be used if a greater switching frequency is selected. The component selection according to frequency also ties with the component selection for ZVS such that a certain combination of design parameters will provide the maximum efficiency, with the smallest components, and while achieving ZVS. One non-limiting aspect of the present invention contemplates the converter components being selected to operate at maximum efficiency and ZVS when producing 3.3 kW at a switching frequency of 250 kHz.

Figure 2:
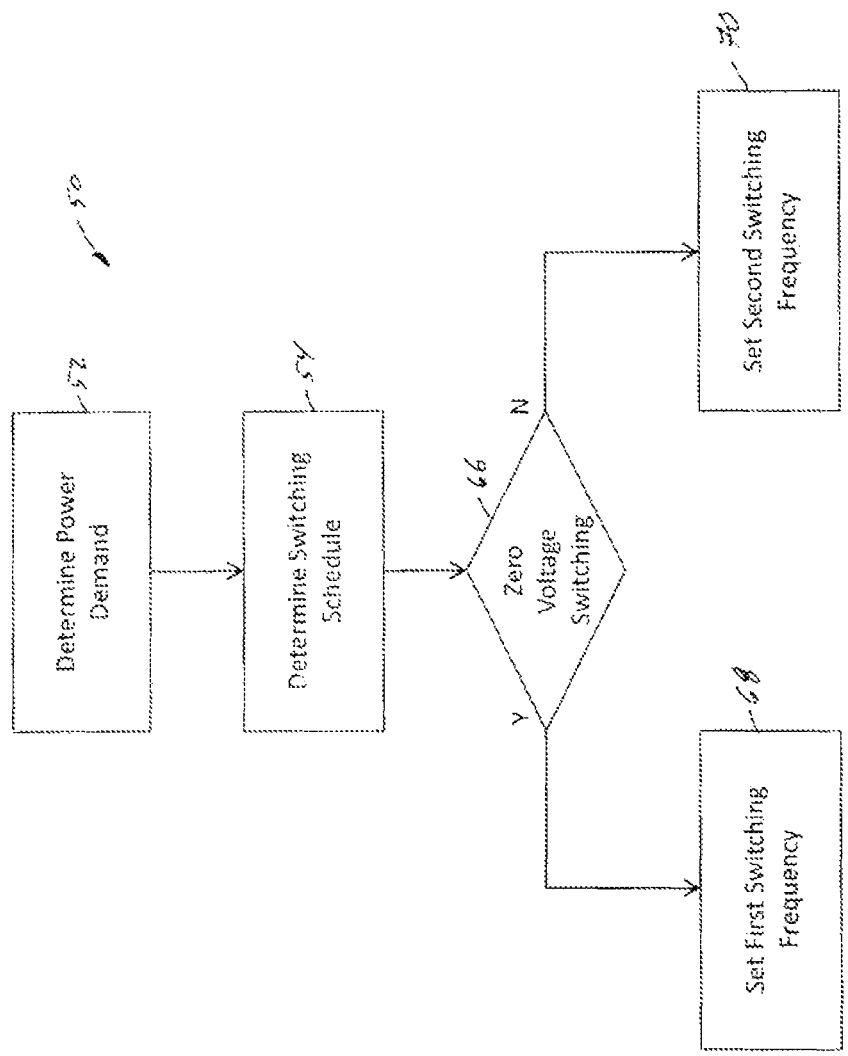
FIG. 2 illustrates a flowchart for a method of controlling a converter in accordance with one non-limiting aspect of the present invention.

FIG. 2 illustrates a flowchart 50 for a method of controlling the converter 12 in accordance with one non-limiting aspect of the present invention. The method may be embodied with instructions or other logical operators stored on in a computer-readable medium of the controller 22. The controller 22 may include a processor and suitable input/output features to facilitate executing the contemplated operations. The method is described with respect to the exemplary use of the converter 12 described above being operable to facilitate processing a DC input for output to one or more vehicle loads 14. The method, however, is not necessarily so limited and the present invention fully contemplates the method being used to facilitate controlling converters used to support non-vehicle based loads.

Block 52 relates to determining a power demand. The power demand may be determined by the controller 22 receiving a power request from one or more of the loads 14 indicating a need for power and/or through some other assessment steps, such as activation of a vehicle switch, driver depression of an acceleration pedal, etc. The power demand may be calculated to equal a total amount of power needed by the one or more active loads 14 and/or according to the particular characteristics of the power requested for delivery, i.e., in the case of DC, the characteristics may define power, voltage, and/or current (in the event the rectifiers 32, 34 are omitted or other AC loads are connected before the rectifier, AC variables such as frequency may also be specified). For exemplary purpose, the power level is intended to encompass any characteristics of the energy demanded by the loads.

Block 54 relates to determining a switching schedule to meet the power demand. The switching schedule corresponds with a control strategy for controlling transitioning of the switches A1, A2, B1, B2, C1, C2, D1, D2 between the open state and the closed state in order to facilitate delivery of the desired DC output at the desired power level. The switches A1, A2, B1, B2, C1, C2, D1, D2 may be switching in pairs in order to generate a modified or squared sine wave as the AC input to the transformers 32, 34. The pairs may consist of the A and C switches and the B and D switches where the on/off cycles of each pair are opposite and mirrored, resulting in the A and B switches being mirrored and the C and D switches being mirrored.

FIGS. 3-4 illustrate exemplary switching schedules 58, 60 for an A switch and a C switch where the switches A1, A2, B1, B2, C1, C2, D1, D2 are switched with no phase shifting (FIG. 3) and with phase shifting (FIG. 4). An amount of phase shift may be introduced between the pairs to control the power level of the DC output such that the maximum power occurs where there is no phase shift and decreases therefrom in proportion to the amount of phase shift. The present invention contemplates controlling the power level using the phase shift in order to limit saturation of the transformers 28, 30. Another option that may be used in place of or in combination with the phase shifting relates to controlling a duty cycle of each switch A1, A2, B1, B2, C1, C2, D1, D2. FIGS. 3-4 illustrate a fixed duty cycle of 50%, however, the duty cycles may be changeable to further facilitate adjusting the output power level of the DC output (assuming transformer saturation and other attendant issued associated with a non-50% duty cycle can be addressed).

Returning to FIG. 2, Block 66 relates to assessing whether the switching schedule required for generating the demanded power level results in ZVS or NZVS. This assessment may be made by the controller 22 assessing whether the power level, duty cycle, and/or phase shift specified in the switching schedule corresponds with ZVS or NZVS conditions, i.e., the controller may include a look-up table or other predefined reference for making the determination based on one or more of values of the noted parameters. The assessment may also be made, or confirmed during operation, by the controller 22 measuring or otherwise actually assessing a voltage across one or more of the/switches. This may be helpful, for example, if the controller automatically sets the switching schedule to meet the power demand without prior knowledge of whether the resulting schedule produces ZVS or NZVS. This capability may also be helpful in adjusting for converter fatigue or other operational changes that may cause a change in the ZVS and NZVS operating thresholds.

Block 68 relates to the controller 22 setting a first switching frequency (see FIG. 3) for controlling the switches in the event ZVS is determined. The first switching frequency may correspond with the optimally switching frequency designed for the converter 12, which may correspond with the power level being 3.3 kW or some other power level equal to or above a corresponding power level threshold. One non-limiting aspect of the present invention contemplates optimal converter conditions to be 3.3 kW at a switching frequency of 250 kHz. The first switching frequency may be set to corresponding with the optimal switching frequency of 250 kHz.

Block 70 relates to the controller 22 setting a second switching frequency for controlling the switches in the event NZVS is determined. Since the ZVS may be designed to occur when operating closely to the maximum or nominal operating conditions, determining NZVS may indicate the converter 12 is being requested to operate below maximum levels and/or to provide less power. One non-limiting aspect of the present invention contemplates ameliorating the efficiency losses associated with operating under NZVS conditions by reducing the switching frequency relative to the design/nominal switching frequency (the first switching frequency). The reduced switching frequency of the second switching frequency reduces the number of times the switches A1, A2, B1, B2, C1, C2, D1, D2 are transitioned between open and closed states. Since each transition induces a switching loss, the total switching losses can be reduced by reducing the number of transitions.

The second switching frequency contemplated by Block 70 may correspond with a predefined value, such as but not limited to 125 kHz, or a proportional value. The proportional value may be determined based on the amount of NZVS (e.g., the voltage across at least one of the switches) and/or an algorithm based on the output power level. The proportional value may be selected to reduce the switching frequency by amount sufficient to balance the switching losses versus the reduced performance attendant to lower switching frequencies. The predefined value may be used instead of the proportional value to control switching transitions whenever NZVS is determined so that the controller 22 need not perform the additional processing associated with making a proportional reduction in the switching frequency.

As supported above, a systematical method can be provided for high switching frequency of high power DC-DC converter with wide output voltage range such that the converter 12 is operable with desired low switching frequency for light load and high switching frequency for rated power outputs. This invention relates to, but is not necessarily limited to, DC-to-DC converters, DC-to-AC inverters, AC-DC converters and AC-to-AC converters. One characteristic of this control technology is to vary switching frequencies to achieve optimum performances from light load (zero load) to full power load.

ZVS control is one method contemplated by the present invention to use high switching frequency to achieve high power density in power converter design and implementation. Since the attendant ZVS range is a bottleneck to design a wide load range, especially for applications with required load power changing from zero power to full high power (due to the converter changing to hard switching when working for light load which is out of ZVS range, which can cause high thermal stress or even thermal runaway on power switches), the present invention provides a solution with its variable frequency control.

Figure 5:
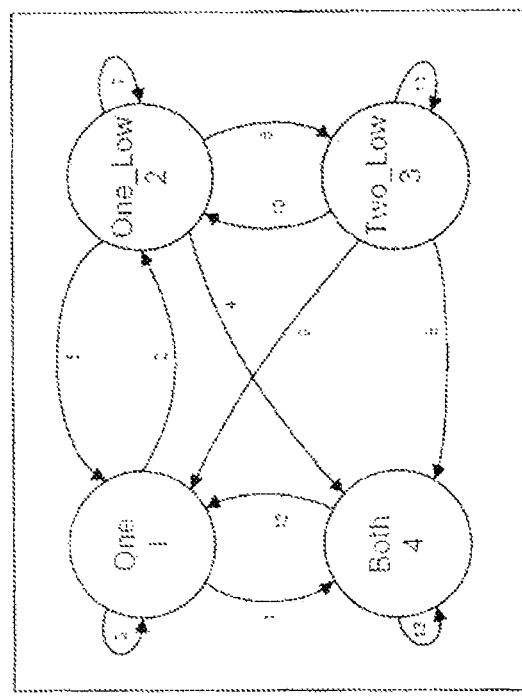
FIG. 5 illustrates a state diagram in accordance with one non-limiting aspect of the present invention.
Figure 6A:
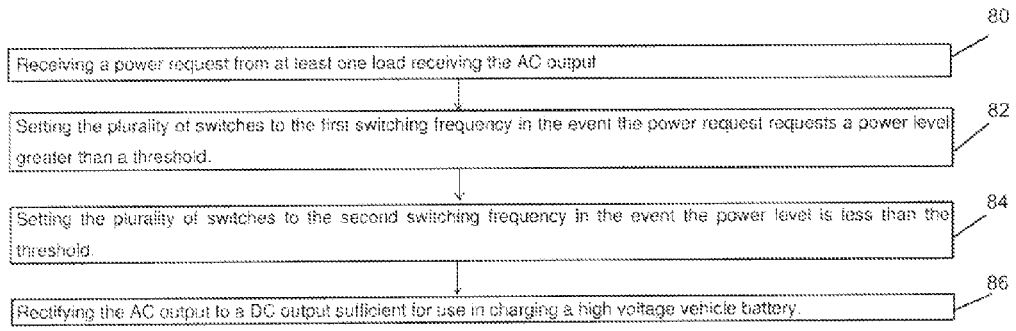
FIGS. 6a-6d illustrate various operations and/or functions in accordance with non-limiting embodiments of the system and method described herein.
Figure 6B:
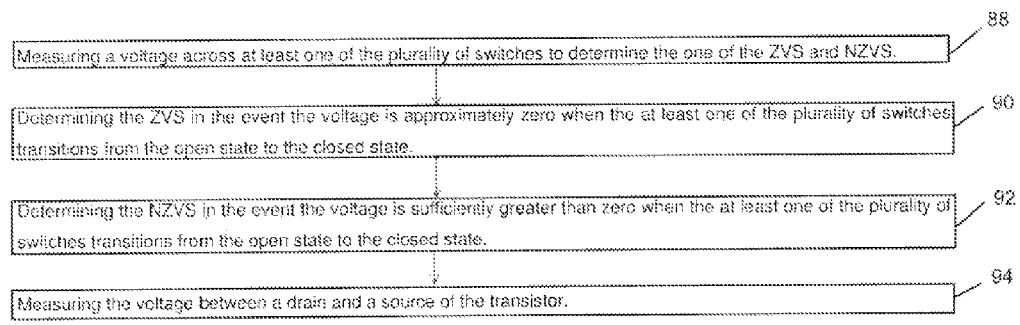
Figure 6C:
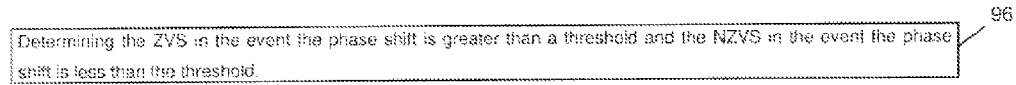
Figure 6D:
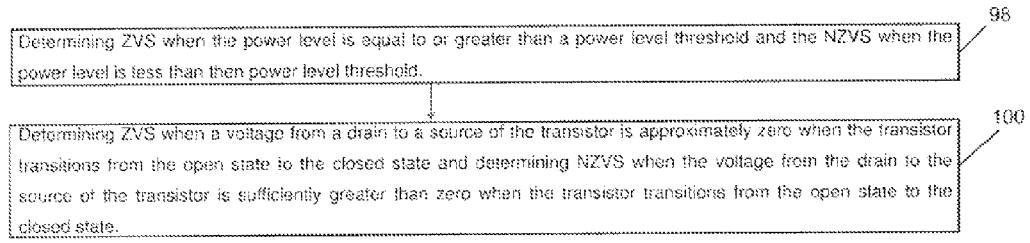

FIG. 5 illustrates a state diagram in accordance with one non-limiting aspect of the present invention. The following tables provide definition for the state control contemplated in FIG. 5.

| Function General Information | |
| --- | --- |
| Function Name | HV_Converter_Select |
| Function Rate | 100 ms (10 Hz.) |

| Input Name | Description | Source | Range |
| --- | --- | --- | --- |
| VINAC_FILT | AC input voltage (RMS), heavily filtered (~1 second time constant) | Input Processing | 0-300 |
| OUTPUT_PWR_FILT | Charger output power (W), heavily filtered (~1 second time constant) | Input Processing | 0-4000 |

| Output Name | Description | Destination | Range |
| --- | --- | --- | --- |
| HV_Select_State | State of the HV converter select. 1 = Two_Low, 4 = Both<br>Initial condition = 1 | | 1 or 2 or 3 |
| Converter_Select | Flag indicating if which HV converters are to be operated. When equal to 1, converter #1 is used. When equal to 2, converter #2 is used, when equal to 3, both HV converters are used.<br>Initial condition = 1 | HV Converter state machine function | 1 or 2 or 3 |
| Tap_Flag | Flag indicating if only 1 or if both HV converter are being used. 0 is 1 converter, 1 means both converters.<br>Initial condition = 0 | HV current limit function | 0 or 1 |
| Switching_Freq | Switching Frequency to set the HV converter to.<br>Default = 250 kHz | Sync signal generator function | 0-250 kHz |

| State Name | Description | Range |
| --- | --- | --- |
| HV_Select_State | Code for which HV converters are to be operated (One, Two or Both).<br>Initial Condition = One | 1 or 2 or 3 |
| Timer | Timer used to switch between HV converters when at low power. One count is 100 ms (task time).<br>Initial condition-0 | 0 to 1000 |

| Calibration Name | Description | Range |
| --- | --- | --- |
| Tap_Limit | AC input voltage, below which only one of the HV converters is used.<br>Default = 160 VAC | 0-300 |
| Tap_Hysteresis | Hysteresis to be used to prevent chattering between hi-tap and lo-tap.<br>Default = 10 V | 0-100 |
| Single_Converter_Threshold | Threshold used to switch to/from single/double converter operation.<br>Default = 1000 W | 0-4000 |
| Low_Power_Threshold | Threshold used to start switching between single converters and also reducing the switching frequency.<br>Default = 300 W | 0-4000 |
| Power_Hysteresis | Hysteresis to be used to keep from chattering between states.<br>Default = 200 W | 0-4000 |
| Low_Power_Time | Max time to operate a single converter at low power before switching to the other (to let them cool off).<br>Default = 100 counts (which is 10 seconds at 100 ms task rate) | 0-1000 |
| Low_Sw_Freq | Switching frequency to set at low output power to reduce losses.<br>Default = 125 kHz | 0-250 kHz |

State Transition Matrix:

1) For this matrix, the transition order implies precedence. This means that, for instance, if the current state is "One", the condition for transition to "Both" is checked first and if the condition is true then the state transition is made without checking any other conditions.

2) The outputs are assumed to be persistent—that is if no action is taken to change any of the outputs during a given execution of the state machine, the last values for all of the outputs should still be used.

3) If no conditions for transition are met, the state shall not change and no actions are to be taken.

4) Only one state transition is allowed per execution of the state machine.
5) Default state of low power for starting charging is "One" using a flag control for identification of start state.
6) The state machine is applied to 3.3 kW full-bridge AC-to-DC battery charger with two interleaved sub-converters.

One_Low State

The One_Low state operates HV converter #1 at lowered switching frequency. This is used when the power demand is very low. A timer is also set to alternate between HV converter #1 and HV converter #2 so that they each have cool-off time.

| Transition # | Start State | End State | Conditions To Transition | Actions at Transition |
|---|---|---|---|---|
| 1 | One | Both | OUTPUT_PWR_FILT > Single_Converter_Threshold and VINAC_FILT > Tap_Limit | Set Converter_Select = 3<br>Set Tap_Flag = 1<br>Set Switching_Freq = 250 kHz |
| 2 | One | One_Low | OUTPUT_PWR_FILT < (Low_Power_Threshold − Power_Hysteresis) | Set Time = 0<br>Set Converter_Select = 1<br>Set Tap_Flag = 0<br>Set Switching_Freq = Low_Sw_Freq |
| 3 | One | One | None - default transition | If (OUTPUT_PWR_FILT > Low_Power_Threshold + Power_Hysteresis) set timer = 0<br>If (OUTPUT_PWR_FILT < Low_Power_Threshold) Set Timer = Timer + 1 |
| 4 | One_Low | Both | OUTPUT_PWR_FILT > Single_Converter_Threshold and VINAC_FILT > Tap_Limit | Set Converter_Select = 3<br>Set Tap_Flag = 1<br>Set Switching_Freq = 250 kHz |
| 5 | One_Low | One | OUTPUT_PWR_FILT > (Low_Power_Threshold) | Set Timer = 0<br>Set Converter_Select = 1<br>Set Tap_Flag = 0<br>Set Switching_Freq = 250 kHz |
| 6 | One_Low | Two_Low | Timer >= Low_Power_Time | Set Timer = 0<br>Set Converter_Select = 2<br>Set Tap_Flag = 0<br>Set Switching_Freq = Low_Sw_Freq |
| 7 | One_Low | One_Low | None - default transition | If (OUTPUT_PWR_FILT > Low_Power_Threshold + Power_Hysteresis) set timer = 0<br>If (OUTPUT_PWR_FILT < Low_Power_Threshold) Set Timer = Timer + 1 |
| 8 | Two_Low | Both | OUTPUT_PWR_FILT > Single_Converter_Threshold and VINAC_FILT > Tap_Limit | Set Converter_Select = 3<br>Set Tap_Flag = 1<br>Set Switching_Freq = 250 kHz |
| 9 | Two_Low | One | OUTPUT_PWR_FILT > (Low_Power_Threshold) | Set Timer = 0<br>Set Converter_Select = 1<br>Set Tap_Flag = 0<br>Set Switching_Freq = 250 kHz |
| 10 | Two_Low | One_Low | Timer >= Low_Power_Time | Set Timer = 0<br>Set Converter_Select = 1<br>Set Tap_Flag = 0<br>Set Switching_Freq = Low_Sw_Freq |
| 11 | Two_Low | Two_Low | None - default transition | If (OUTPUT_PWR_FILT > Low_Power_Threshold + Power_Hysteresis) set timer = 0<br>If (OUTPUT_PWR_FILT < Low_Power_Threshold) Set Timer = Timer + 1 |
| 12 | Both | One | OUTPUT_PWR_FILT < (Single_Converter_Threshold − Power_Hysteresis) or VINAC_FILT < (Tap_Limit − Tap_Hysteresis) | Set Timer = 0<br>Set Convertert_Select = 1<br>Set Tap_Flag = 0 |
| 13 | Both | Both | None - default transition | None |

Explanation of States:
One State:
The One state operates HV converter #1 at normal switching frequency. It is used when at low tap and power is high enough not to need to go to low power mode or if at high tap and output power is within the capacity of a single converter.

Two_Low State

The Two_Low state operates HV converter #2 at lowered switching frequency. This is used when the power demand is very low. A timer is also set to alternate between HV converter #1 and HV converter #2 so that they each have cool-off time.

Both State

The Both state operates both HV converter #1 and HV converter #2 at full switching frequency. This is used when at high tap and the output power demand is greater than one single converter can produce.

FIGS. 6a-6d illustrate various operations and/or functions 80-100 in accordance with non-limiting embodiments of the system 10 and method described in detail above, including operations and/or functions which may be associated with components of the system 10 described herein such as controller 22 and/or other components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a converter having a plurality of switches for use in converting a DC input to an AC output, the plurality of switches being selectively operable between an open state and a closed state to provide variable switching frequency, the method comprising:
    determining a first switching frequency for the plurality of switches, the first switching frequency operable to induce zero voltage switching (ZVS) of the plurality of switches when transitioning from the open state to the closed state, such that the AC output has a first power level;
    determining a second switching frequency for the plurality of switches, the second frequency less than the first frequency, the second switching frequency operable to induce non-zero voltage switching (NZVS) of the plurality of switches when transitioning from the open state to the closed state, such that the AC output has a second power level less than the first power level;
    measuring a voltage across at least one of the plurality of switches to determine one of ZVS and NZVS;
    determining ZVS in the event the voltage is approximately zero when the at least one of the plurality of switches transitions from the open state to the closed state; and
    determining NZVS in the event the voltage is sufficiently greater than zero when the at least one of the plurality of switches transitions from the open state to the closed state.

2. The method of claim 1 further comprising determining a switching schedule for the plurality of switches when set to the first switching frequency, the switching schedule causing the AC output to have the first power level.

3. The method of claim 2 further comprising phase shifting the switching schedule for the plurality of switches when set to the second switching frequency, the phase shifting causing the AC output to have the second power level less than the first power level.

4. The method of claim 1 further comprising:
    receiving a power request from at least one load receiving the AC output;
    setting the plurality of switches to the first switching frequency in the event the power request requests a power level greater than a threshold; and
    setting the plurality of switches to the second switching frequency in the event the power level is less than the threshold.

5. The method of claim 1 further comprising rectifying the AC output to a DC output sufficient for use in charging a high voltage vehicle battery.

6. A method of controlling a converter having a plurality of switches operable with a transformer to convert a DC input to an AC output, the plurality of switches being selectively operable between an open state and a closed state to provide variable switching frequency, the method comprising:
    determining a power level for the AC output;
    determining a switching schedule for the plurality of switches sufficient to generate the AC output at the power level;
    determining the switching schedule to induce the plurality of switches to transition from the open state to the closed state with one of zero voltage switching (ZVS) and non-zero voltage switching (NZVS);
    determining a first switching frequency for the plurality of switches in the event ZVS is determined, such that the AC output has a first power level;
    determining a second switching frequency for the plurality of switches in the event NZVS is determined, the second switching frequency less than the first switching frequency, such that the AC output has a second power level less than the first power level;
    measuring a voltage across at least one of the plurality of switches to determine one of ZVS and NZVS;
    determining ZVS in the event the voltage is approximately zero when the at least one of the plurality of switches transitions from the open state to the closed state; and
    determining NZVS in the event the voltage is sufficiently greater than zero when the at least one of the plurality of switches transitions from the open state to the closed state.

7. The method of claim 6 further comprising determining the second switching frequency to be half of the first switching frequency.

8. The method of claim 6 further comprising determining the power level to equal a total power demand of one or more loads actively operable within a vehicle to receive the AC output.

9. The method of claim 8 further comprising rectifying the AC output to a DC output prior to receipt by at least one of the one or more loads.

10. The method of claim 6 further comprising phase shifting the plurality of switches when operating according to the second switching frequency by an amount greater than when operating according to the first switching frequency.

11. The method of claim 6 where the at least one switch is a transistor and the method further comprising measuring the voltage between a drain and a source of the transistor.

12. The method of claim 6 wherein the switching schedule specifies a phase shift for the plurality of switches, and wherein the method further comprises determining the ZVS in the event the phase shift is greater than a threshold and the NZVS in the event the phase shift is less than the threshold.

13. A system for powering one or more loads within a vehicle, the system comprising:
    a converter having a plurality of switches configured to operate with a transformer and a rectifier to convert a DC input to an AC output and then to rectify the AC output to a DC output for use in powering the one or more loads, each of the plurality of switches having an open state and a closed state;
    a controller for selectively controlling switching of the plurality of switches between the open and closed states to provide variable switching frequency, the controller configured to:

i. determine a power level for the DC output based on a one or more of the one or more loads actively requesting the DC output;
ii. determine switching required of the plurality of switches to facilitate output of the DC output at the determined power level as one of zero voltage switching (ZVS) and non-zero voltage switching (NZVS);
iii. selectively control switching of the plurality of switches at a first switching frequency in the event ZVS is determined, such that the DC output has a first power level; and
iv. selectively control switching of the plurality of switches at a second switching frequency in the event NZVS is determined, the second switching frequency less than the first switching frequency, such that the DC output to has a second power level less than the first power level;

wherein at least one of the plurality of switches is a transistor, and wherein ZVS is determined when a voltage from a drain to a source of the transistor is approximately zero when the transistor transitions from the open state to the closed state and NZVS is determined when the voltage from the drain to the source of transistor is sufficiently greater than zero when the transistor transitions from the open state to the closed state.

14. The system of claim 13 wherein the controller determines ZVS when the power level is equal to or greater than a power level threshold and the controller determines NZVS when the power level is less than power level threshold.

15. The system of claim 13 wherein the first switching frequency is 250 kHz in the event the power level is approximately 3.3 kW and the second switching frequency is 125 kHz in the event the power level is less than 500 W.

* * * * *

UNITED STATES PATENT AND TRADEMARK OFFICE
CERTIFICATE OF CORRECTION

PATENT NO.         : 9,306,465 B2                                           Page 1 of 1
APPLICATION NO.    : 13/157452
DATED              : April 5, 2016
INVENTOR(S)        : Wu et al.

It is certified that error appears in the above-identified patent and that said Letters Patent is hereby corrected as shown below:

In the claims,

Column 13, Line 16, Claim 13:

After "DC output"
Delete "to".

Signed and Sealed this
Seventh Day of June, 2016

Michelle K. Lee
*Director of the United States Patent and Trademark Office*